(12) United States Patent
Reeves

(10) Patent No.: US 12,452,646 B2
(45) Date of Patent: Oct. 21, 2025

(54) SYSTEM AND METHOD FOR NORMALIZING NETWORK DEVICE COMMUNICATION CAPABILITIES

(71) Applicant: T-Mobile Innovations LLC, Overland Park, KS (US)

(72) Inventor: Raymond E. Reeves, Orlando, FL (US)

(73) Assignee: T-Mobile Innovations LLC, Overland Park, KS (US)

( * ) Notice: Subject to any disclaimer, the term of this patent is extended or adjusted under 35 U.S.C. 154(b) by 686 days.

(21) Appl. No.: 17/850,031

(22) Filed: Jun. 27, 2022

(65) Prior Publication Data
US 2023/0422019 A1 Dec. 28, 2023

(51) Int. Cl.
*H04W 8/22* (2009.01)
*H04W 24/10* (2009.01)

(52) U.S. Cl.
CPC .............. *H04W 8/22* (2013.01); *H04W 24/10* (2013.01)

(58) Field of Classification Search
CPC ..... H04W 24/10; H04W 24/02; H04W 72/23; H04W 72/21; H04W 24/08; H04W 48/16; H04W 88/06; H04W 4/70; H04W 48/20; H04W 36/0058; H04W 36/08; H04W 64/00; H04W 72/0453; H04W 76/15; H04W 68/005; H04W 72/0446; H04W 36/0085; H04W 4/029; H04W 72/044; H04W 74/002

USPC ..................................................... 455/67.11
See application file for complete search history.

(56) References Cited

U.S. PATENT DOCUMENTS

| | | | |
|---|---|---|---|
| 8,060,073 B1 | 11/2011 | Bertz et al. | |
| 2011/0205981 A1* | 8/2011 | Koo ................. | H04L 1/1671 370/329 |
| 2014/0304699 A1* | 10/2014 | He ................... | H04W 8/245 717/171 |
| 2019/0239064 A1 | 8/2019 | Stojanovski et al. | |

* cited by examiner

*Primary Examiner* — Ajibola A Akinyemi
(74) *Attorney, Agent, or Firm* — Jones Robb, PPLC

(57) ABSTRACT

Systems, methods, and processing nodes for managing wireless network communications perform and/or comprise: establishing a trace session; and while the trace session is active: receiving a plurality of message reports, wherein respective ones of the plurality of message reports correspond to protocol interactions between an access node and a wireless device, determining whether the wireless device is technically capable of communicating using a communication technique, determining, from the plurality of message reports, whether the wireless device is communicating with the access node using the communication technique, and in response to a determination that the wireless device is capable of communicating using the communication technique and that the wireless device is not communicating with the access node using the communication technique, initiating an over-the-air upgrade process to enable the communication technique in the wireless device.

19 Claims, 5 Drawing Sheets

SYSTEM AND METHOD FOR NORMALIZING NETWORK DEVICE COMMUNICATION CAPABILITIES

TECHNICAL BACKGROUND

Wireless telecommunications are generally provided via a plurality of geographically overlapping networks. From an infrastructure standpoint, a wireless device ("user equipment" or UE) may receive telecommunications services via an access node. For cellular telephone and data services, the individual networks may implement a plurality of radio access technologies (RATs) simultaneously using one or a plurality of access nodes. RATs can include, for example, 3G RATs such as Global System for Mobile Communications (GSM), Universal Mobile Telecommunications System (UMTS), Code-Division Multiple Access (CDMA), etc.; 4G RATs such as Worldwide Interoperability for Microwave Access (WiMAX), Long Term Evolution (LTE), etc.; and 5G RATs such as new radio (NR).

Each individual network, and each individual RAT, typically supports a large number of end-users and a large number of different types of wireless devices. Different wireless devices may have different capabilities and/or may support different technologies; for example, one wireless device may support a particular communication technique whereas other (e.g., older) wireless devices do not. As network providers proceed with the deployment of improved communication capabilities and technologies within their respective networks, some wireless devices may be modified or updated in order to enable communication using the newly-deployed technologies. For example, wireless devices may be upgraded via an over-the-air (OTA) update by disseminating what may be referred to as a maintenance release (MR). The OTA update process provides a mechanism for network providers to wirelessly deploy new software or firmware to wireless devices, or to otherwise reconfigure the wireless devices to utilize newly-deployed technologies or capabilities.

One non-limiting example of a technology deployment which may be enabled in certain wireless devices using the OTA update process is carrier aggregation (CA). Generally, access nodes and wireless devices communicate with each other using dedicated portions of electromagnetic spectrum. For example, 4G LTE communication utilizes frequencies below 6 gigahertz (GHz), and 5G NR communication utilizes frequencies below 6 GHz (Frequency Range 1) and above 24 GHz (Frequency Range 2). These frequencies are further divided into a plurality of bands. In LTE communication, the bands are further divided into component carriers (CCs), which correspond to bandwidths of up to 20 MHz. In NR communication, CCs may correspond to bandwidths of up to 100 MHz in Frequency Range 1 and up to 400 MHz in Frequency Range 2. Different CCs may be aggregated together to provide increased bandwidth in wireless devices which are capable of supporting CA technology, whether enabled at the point of manufacture or sale or later enabled by an MR.

Overview

Various aspects of the present disclosure relate to systems and methods of normalizing network device communication capabilities within a network, such as a telecommunications network capable of providing advanced communication capabilities to compatible network devices (e.g., to compatible UEs).

In one exemplary aspect of the present disclosure, a method of managing network communications comprises: establishing a trace session; and while the trace session is active: receiving a plurality of message reports, wherein respective ones of the plurality of message reports correspond to protocol interactions between an access node and a wireless device, determining whether the wireless device is technically capable of communicating using a communication technique, determining, from the plurality of message reports, whether the wireless device is communicating with the access node using the communication technique, and in response to a determination that the wireless device is capable of communicating using the communication technique and that the wireless device is not communicating with the access node using the communication technique, initiating an over-the-air upgrade process to enable the communication technique in the wireless device.

In another exemplary aspect of the present disclosure, processing node comprises: a memory; and an electronic processor operatively connected to the memory, the electronic processor configured to perform operations comprising: establishing a trace session, and while the trace session is active: receiving a plurality of message reports, wherein respective ones of the plurality of message reports correspond to protocol interactions between an access node and a wireless device, determining whether the wireless device is technically capable of communicating using a communication technique, determining, from the plurality of message reports, whether the wireless device is communicating with the access node using the communication technique, and in response to a determination that the wireless device is capable of communicating using the communication technique and that the wireless device is not communicating with the access node using the communication technique, initiating an over-the-air upgrade process to enable the communication technique in the wireless device.

In another exemplary aspect of the present disclosure, system for managing network communications comprises: an access node; a wireless device in communication with the access node; and a processing node configured to perform operations comprising: establishing a trace session, and while the trace session is active: receiving a plurality of message reports, wherein respective ones of the plurality of message reports correspond to protocol interactions between an access node and a wireless device, determining whether the wireless device is technically capable of communicating using a communication technique, determining, from the plurality of message reports, whether the wireless device is communicating with the access node using the communication technique, and in response to a determination that the wireless device is capable of communicating using the communication technique and that the wireless device is not communicating with the access node using the communication technique, initiating an over-the-air upgrade process to enable the communication technique in the wireless device.

In this manner, these and other aspects of the present disclosure provide for improvements in at least the technical field of telecommunications, as well as the related technical fields of network management, device management, network security, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
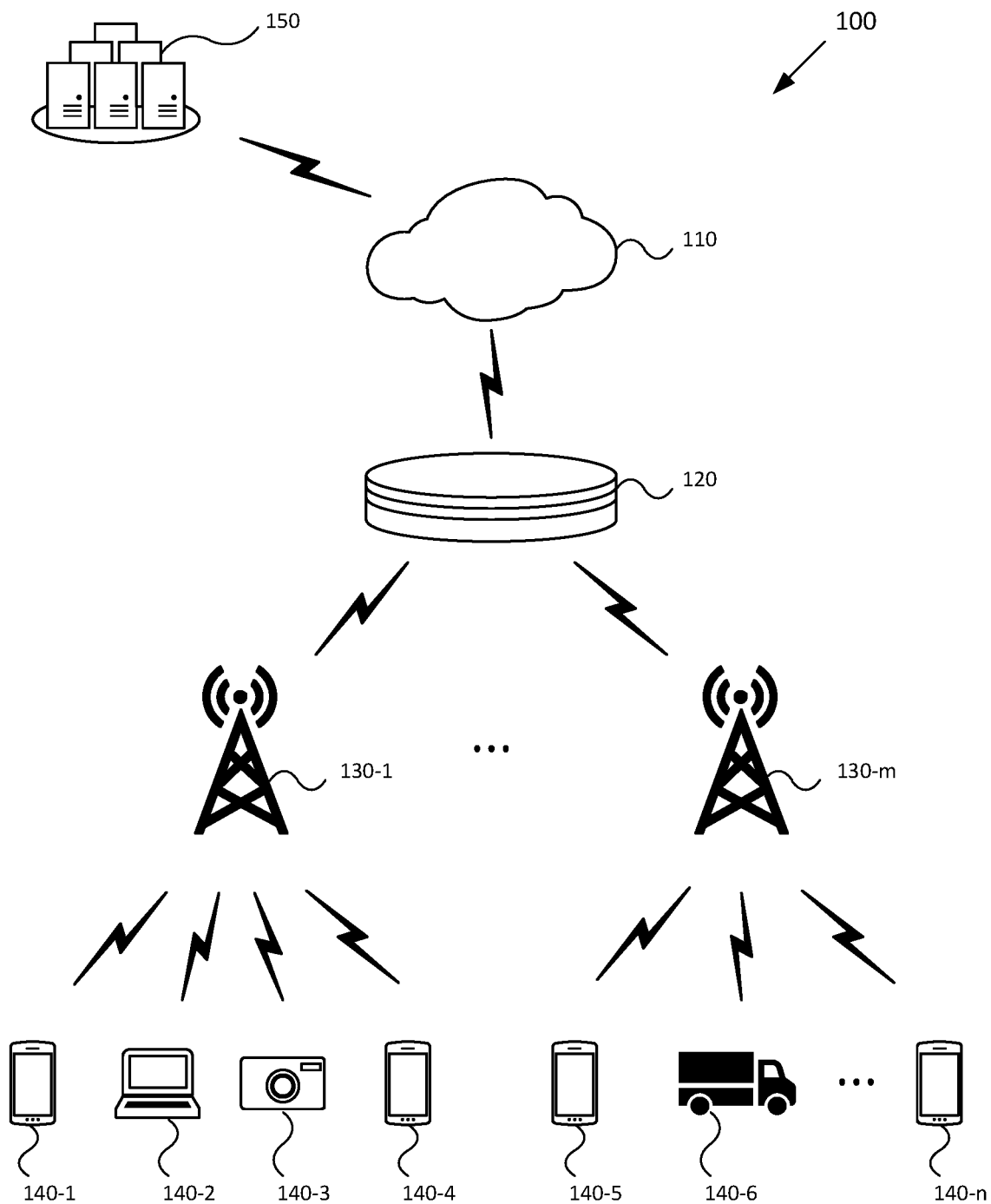
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a processing node or nodes on the network for executing the instructions or methods. The processing node or nodes may include a processor included in the access node and/or a processor included in any controller node in the wireless network that is coupled to the access node.

As noted above, as network operators work to deploy improved communication capabilities and technologies within their respective networks, some wireless devices may be modified or updated in order to enable communication using the newly-deployed technologies. Enhanced wireless device capabilities and/or communication technologies may be implemented using an OTA upgrade. However, due to the nature of the OTA MR upgrade process, some UEs may require several attempts at receiving and installing an MR with the upgraded capabilities. Furthermore, even when an MR is reported as installed on UEs, in some cases a considerable proportion of the UEs fail to engage in communication sessions using the upgraded capabilities. This may be so even in areas where the network is verified to have the upgraded capabilities activated and where test units are used to verify that the upgraded capabilities are actually available. In other words, the OTA MR process may report false positives for a significant number of MR-targeted UEs.

The success of the MR deployment may be difficult or impossible to verify merely by utilizing typical usage metrics like tonnage. Moreover, for certain capabilities (e.g., NR CA) there may exist no means to easily measure the upgrade penetration as there may be no means in use to identify each UE engaged in communication using the upgraded capability.

To address any performance gap that may be caused by failed or incorrect OTA upgrades and to permit accounting of upgrade penetration, especially where installation status and usage metrics are insufficient to accurately measure the degree of success of a network operator's deployment and operation of newly-deployed capabilities, the present disclosure provides for systems and methods for normalizing network device communication capabilities. In some examples, the systems and methods are implemented by a device or processing node responsible for monitoring, assessing, and normalizing faulty UE MR deployments; that is, those deployments that fail to effect the desired upgrade penetration levels and actual usage across the UE population.

For purposes of illustration and explanation, various portions of this detailed description refer to implementations in a network using a 5G (NR) RAT and in which the upgrade is designed to enable NR CA communication; however, the present disclosure is not so limited. The systems and methods described herein may be implemented in any RAT or combination of RATs in which an OTA upgrade process is permissible, including but not limited to 3G RATs such as GSM, UMTS, CDMA, etc.; 4G RATs such as WiMAX, LTE, etc.; 5G RATs such as NR; and further extensions or updated implementations of the same. Moreover, the systems and methods described herein may be implemented with regard to any communication technique which may be enabled using an OTA upgrade process and/or for which a trace session may provide insight into usage and/or upgrade penetration. In the specific example of NR CA deployment, the systems and methods may be implemented using at least one processing node or other device referred to herein as a mobile equipment carrier aggregation normalizer (MECANo).

The systems and methods described herein may be implemented using distributed MECANo agents that may integrate with the existing trace processor systems which receive message reports for various protocol interactions that the access nodes such as a 4G Evolved Node B (eNodeB or eNB) or a next-generation Node B (gNodeB or gNB) engage in with UEs, as well as core mobility entities such as a 4G Mobility Management Entity (MME) or a 5G Core Access and Mobility Management Function (AMF) and/or Session Management Function (SMF). This suite of message reports may include those whereby an access node coordinates network connection configuration with served UEs, including but not limited to connection setup, connection release, and CA reconfiguration requests. Simultaneously, the implementing systems may leverage profile stores to determine whether a UE should have an NR CA usage pattern where the network elements and other UEs in the area also show such usage. The implementing systems may additionally or alternatively leverage operations support system (OSS) integration to augment accounting metrics and trigger reconfiguration should a UE be found to be in violation of the expected behavior associated with the latest MR report for the UE.

Each MECANo agent may be responsible for creating a usage vector corresponding to the manner in which UEs secure network services and generate usage (e.g., corresponding to actual network protocol interactions), as opposed to what usage is observed (e.g., tonnage). The usage vector may inform an associated MECANo manager, which may correspond to the MECANo agents in a one-to-one or one-to-many relationship. The MECANo manager(s) may be responsible for determining whether the associated UE is expected to have NR CA behavior in accordance with its profile. In some implementations, the systems and methods herein may be triggered based on thresholds, such that any corrective actions occur with minimal disruption of service and/or include a back-off mechanism between detections and reevaluations for MR triggers.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as a smartphone, a tablet, a laptop computer, and so on.

Examples described herein may include at least an access node (or base station), such as an eNodeB or a gNodeB, and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an NR gNodeB.

FIG. 1 illustrates an exemplary system 100 for use with various aspects of the present disclosure. As illustrated, the system 100 includes a cloud platform 110, a core network 120, and a plurality of access nodes 130-1 to 130-*m* (collectively referred to as access nodes 130), and a plurality of wireless devices 140-1 to 140-*n* (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network 120 via a wired connection.

The cloud platform 110, which may be an NR cloud platform, may perform processing and forward results to the computing systems and devices 150 and/or the wireless devices 140. The core network 120, which may be an NR core network, connects with the cloud platform 110 and the access nodes 130. Examples of the core network and/or the access nodes 130 will be described in more detail below with respect to FIGS. 2 and 3. Subsets of the access nodes 130 may be respectively configured to provide service in different areas, on different bands, for different RATs, and so on. FIG. 1 illustrates a situation in which the system 100 is operated by a single network operator. In many geographical areas, multiple access nodes 130 provide coverage that may overlap.

The wireless devices 140 are devices configured with appropriate technologies for connecting to the cloud platform 110. The wireless devices 140 may be or include mobile communication devices such as smartphones, laptop computers, tablet computers, and the like; vehicles such as cars, trucks, and the like; and/or Internet-of-Things (IoT) devices such as smart-home sensors, and the like. Examples of the wireless devices 140 will be described in more detail below with respect to FIGS. 2 and 4.

Figure 2:
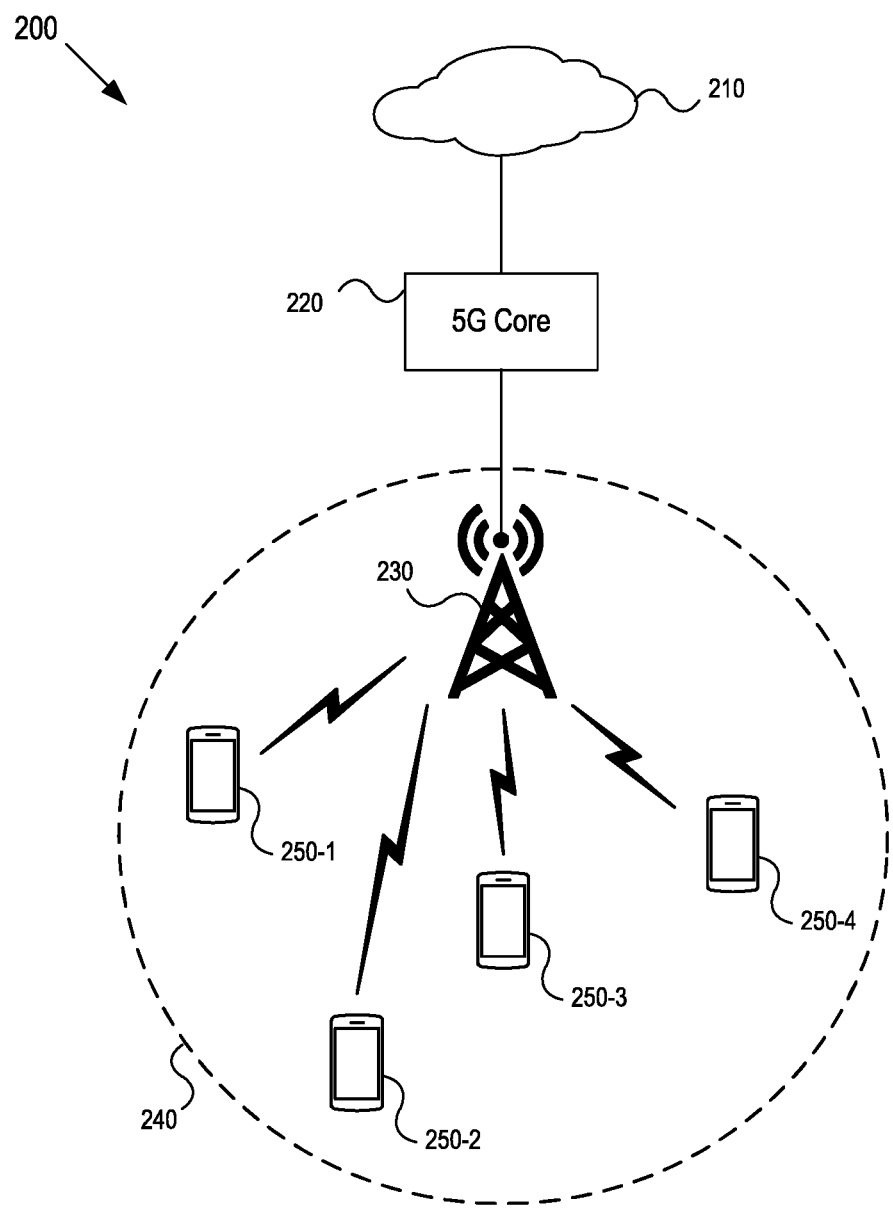
FIG. 2 illustrates an exemplary configuration of a system for wireless communication in accordance with various aspects of the present disclosure

FIG. 2 illustrates a configuration in which a system 200 provides coverage via an access node within a particular area. For purposes of illustration and explanation, the system 200 is illustrated as an NR network; however, in practical implementations the system 200 may correspond to any RAT or combinations of RATs, including but not limited to 3G RATs such as GSM, UMTS, CDMA, etc.; 4G RATs such as WiMAX, LTE, etc.; 5G RATs such as NR; and further extensions or updated implementations of the same.

As illustrated, the system 200 comprises a communication network 210, a 5G core 220, an access node 230 which provides service in a coverage area 240, and a plurality of wireless devices 250-1 to 250-4 (collectively referred to as wireless devices 250). For purposes of illustration and ease of explanation, only one access node and four wireless devices are shown in the system 200; however, as noted above with regard to FIG. 1, additional access nodes and/or additional or fewer wireless devices may be present in the system 200. In the illustration of FIG. 2, the access node 230 is connected to the communication network 210 via an NR path (including the 5G core 220); however, in practical implementations the access node 230 may be connected to the communication network 210 via multiple paths (e.g., using multiple RATs). The access node 230 communicates with the 5G core 220 via one or more communication links, each of which may be a direct link (e.g., an X2 link, a Si link or the like). The access node 230 may also communicate with additional access nodes via a direct link.

A scheduling entity may be located within the access node 230 and/or the 5G core 220, and may be configured to accept and deny connection requests and manage communication sessions and/or MR deployments, as will be described in more detail below. The access node 230 may be any network node configured to provide communications between the connected wireless devices and the communication network 210, including standard access nodes and/or short range, lower power, small access nodes. As examples of a standard access node, the access node 230 may be a macrocell access node, a base transceiver station, a radio base station, a gNodeB in 5G networks, an eNodeB in 4G/LTE networks, or the like, including combinations thereof. In one particular example, the access node 230 may be a macrocell access node in which a range of the coverage area 240 is from approximately five to thirty-five kilometers (km) and in which the output power is in the tens of watts (W). As examples of a small access node, the access node 230 may be a microcell access node, a picocell access node, a femtocell access node, or the like, including a home gNodeB or a home eNodeB.

The access node 230 can comprise one or more processors and associated circuitry to execute or direct the execution of computer-readable instructions such as those described herein. In so doing, the access node 230 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the access node 230 can receive instructions and other input at a user interface.

Figure 3:
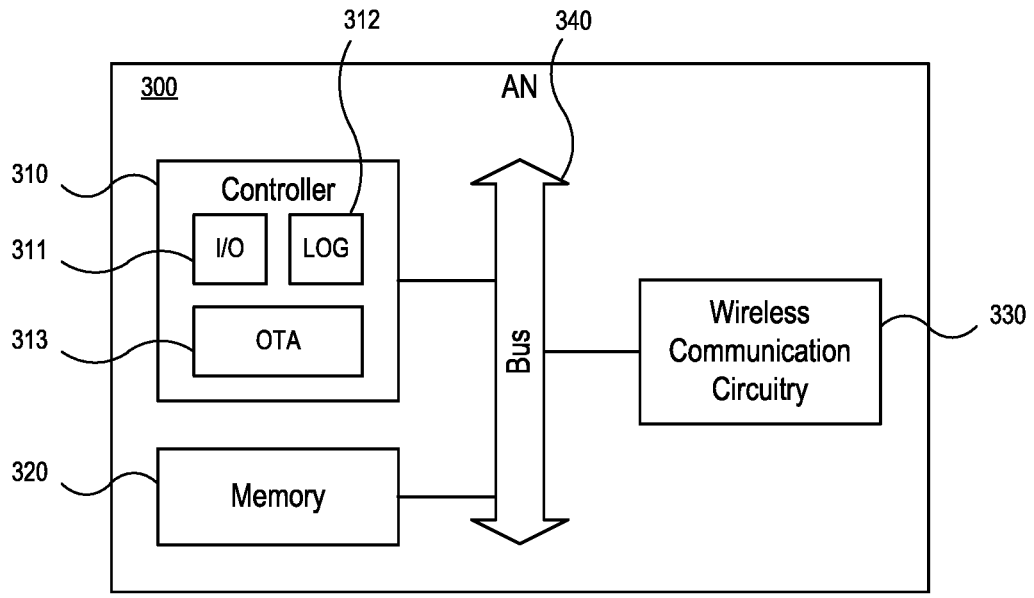
FIG. 3 illustrates an exemplary access node in accordance with various aspects of the present disclosure.

FIG. 3 illustrates one example of an access node 300, which may correspond to one or more of the access nodes 130 shown in FIG. 1 and/or the access node 230 shown in FIG. 2. As illustrated the access node 300 includes a controller 310, a memory 320, wireless communication circuitry 330, and a bus 340 through which the various elements of the access node 300 communicate with one another. The controller 310 may include sub-modules or units, each of which may be implemented via dedicated hardware (e.g., circuitry), software modules which are loaded from the memory 320 and processed by the controller 310, firmware, and the like, or combinations thereof. Some or all of the sub-modules or units may physically reside within the controller 310, or may instead reside within the memory 320, the wireless communication circuitry 330, and/or may be provided as separate units within the access node 300. In FIG. 3, three sub-modules are shown: an input/output (I/O) module 311, a logic module 312, and an OTA module 313. In practical implementations, additional sub-modules or units may be provided. Moreover, while FIG. 3 illustrates the I/O module 311, the logic module 312, and the OTA module 313 as separate sub-modules, in practical implementations some or all of the units may be combined and/or share components.

The controller 310 is one example of a trace processor in accordance with the present disclosure. The controller 310 may also be an example of a central processing unit (CPU) of the access node 300. However, in some implementations the trace processor may be separate from the CPU of the access node 300, and may even be provided in a device separate from the access node 300. In any event, the component operating as the trace processor may be configured to establish a trace session for communications between the access node 300 and one or more connected wireless devices. In general, a "trace session" is a period of time during which message reports are received, the message reports corresponding to protocol interactions between the access node 300 and the one or more connected wireless devices. The protocol interactions include but are not limited to connection setup events, connection release events, and/or carrier aggregation reconfiguration request events.

The trace session may be established in response to a command by the network operator, may occur at predetermined intervals, may occur in response to a signaling condition, or combinations thereof. The trace session may be established with a predetermined collection period or measurement period or may be open-ended such that it ends at a time to be determined later (e.g., in response to a stop trigger event). In one example, the signaling condition may be whether a parameter monitored by the controller 310 exceeds a threshold set by the controller 310, and the stop trigger event may be that the parameter no longer exceeds the threshold. In one particular example, the parameter may be the percentage of capable devices that are performing CA, and the threshold may be a predetermined percentage (e.g., 95%).

The trace session may be established for a predetermined geographical area, which may be congruent with the coverage area of the access node 300 or the coverage area of multiple access nodes. The trace session may be established for all wireless devices within the predetermined geographical area and in communication with the access node 300. Thus, establishing the trace session may include creating a session profile for every connected wireless device, the determinations (which will be described in more detail below) may be performed for every connected wireless device, and the determination results may be stored in the corresponding session profile.

To distinguish the trace session from other trace sessions that may be previously, subsequently, or concurrently established, the trace session may be provided with a globally-unique trace reference identifier. At the time the trace session is established, the trace depth (i.e., the level of detail of information to be traced) may also be specified. Generally, the trace depth is set so as to be sufficient to determine whether the wireless devices connected to the access node 300 are operating using the communication technique under analysis (e.g., a CA technique such as NR CA).

While the trace session is active, the I/O module 311 is configured to receive a plurality of the message reports as described above. The I/O module 311 may then be configured to provide the plurality of message reports (or a subset thereof) to the logic module 312 to perform various determinations for the wireless device corresponding to the message reports. These determinations may include, while the trace session is active, determining whether the wireless device is technically capable of communicating using the communication technique and/or determining whether the wireless device is in fact communicating with the access node using the communication technique. The logic module 312 may also perform determinations relevant to the establishing or ending the trace session, such as determining whether the parameter exceeds the threshold and/or determining whether the parameter no longer exceeds the threshold after previously exceeding the threshold. The logic module 312 may be configured to query other network entities in order to perform the determinations; for example, the logic module 312 may determine whether the wireless device is technically capable of communicating using the communication technique in part by querying a network entity for a capability profile corresponding to the wireless device.

The OTA module 313 may be configured to perform an MR deployment in response to certain conditions. For example, while the trace session is active and in response to determinations (e.g., by the logic module 312) that the wireless device is capable of communicating using the communication technique and that the wireless device is not communicating with the access node using the communication technique, the OTA module may be configured to initiate an OTA upgrade process to enable the communication technique in the wireless device. The OTA upgrade process may be performed for all wireless devices located in the predetermined geographical area and connected to the access node, or may be performed for only a subset of the wireless devices (e.g., those wireless devices which are capable of the communication technique but are not in fact performing the communication technique).

The wireless communication circuitry 330 may include circuit elements configured for inbound communication to receive wireless signals (e.g. one or more antennas) as well as interface elements configured, for example, to translate data signals from wireless input into control or other signals for the controller 310. Moreover, the wireless communication circuitry 330 may include circuit elements configured for outbound communication to generate wireless signals (e.g., one or more antennas) as well as interface elements configured, for example, to translate control signals from the controller 310 into data signals for wireless output. For example, the access node 300 may be configured to receive connection requests and/or message reports via the wireless communication circuitry 330 and output connection determinations, acknowledgements, and/or commands via the wireless communication circuitry 330, thereby allowing or denying the connection requests. The access node 300 may be configured to transmit an OTA upgrade package via the wireless communication circuitry 330, which may then be installed by the connected wireless device(s). The access node 300 may include additional wireless communication circuitry elements, for example to communicate using additional frequencies and/or to provide connectivity for different RATs. The access node 300 may further include additional wired communication circuitry elements.

While the above description ascribes certain operations to particular sub-modules or units of the controller 310, the present disclosure is not so limited. It is sufficient that any component of the trace processor, whether a part of the access node 300 or of a separate entity, perform the above-described operations.

Figure 4:
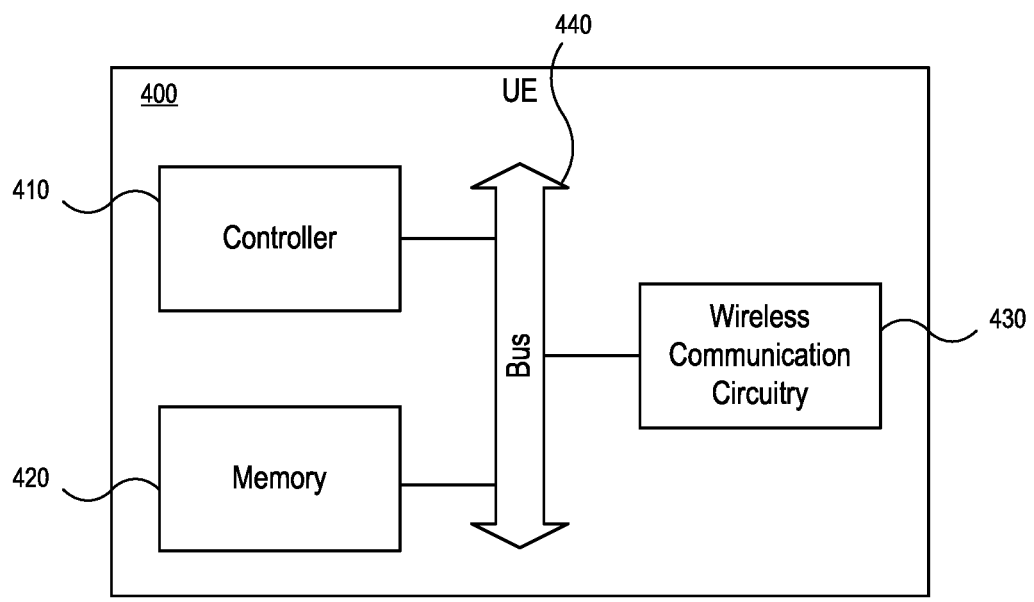
FIG. 4 illustrates an exemplary wireless device in accordance with various aspects of the present disclosure.

FIG. 4 illustrates one example of a wireless device 400 (i.e., a UE), which may correspond to one or more of the wireless devices 140 shown in FIG. 1 and/or one or more of the wireless devices 250 shown in FIG. 2. As illustrated, the wireless device 400 includes a controller 410, a memory 420, a wireless communication circuitry 430, and a bus 440 through which the various elements of the wireless device 400 communicate with one another. The controller 410 may include various sub-modules or units to implement operations and processes in accordance with the present disclosure; for example to respond to queries/commands and/or to install an OTA upgrade package. Such sub-modules or units may physically reside within the controller 410, may reside within the memory 420, and/or may be provided as separate units within the wireless device 400.

The wireless communication circuitry 430 may include circuit elements configured for inbound communication to receive wireless signals (e.g. one or more antennas) as well as interface elements configured, for example, to translate data signals from wireless input into control or other signals for the controller 410. Moreover, the wireless communication circuitry 430 may include circuit elements configured for outbound communication to generate wireless signals (e.g., one or more antennas) as well as interface elements configured, for example, to translate control signals from the controller 410 into data signals for wireless output. For example, the wireless device 400 may be configured to transmit connection requests via the wireless communication circuitry 430 and receive responses and/or commands via the wireless communication circuitry 430, the responses indicating whether the connection requests have been accepted or denied and/or instructing the wireless device 400 to perform an upgrade. The wireless device 400 may include additional wireless communication circuitry elements, for example to communicate using different RATs.

Returning to FIG. 2, the communication network 210 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication network 210 can be capable of carrying data, for example to support voice, push-to-talk (PTT), broadcast video, and/or data communications by the wireless device 250. Wireless network protocols can comprise Multimedia Broadcast Multicast Services (MBMS), CDMA, 1×RTT, GSM, UMTS, High Speed Packet Access (HSPA), Evolution-Data Optimised (EV-DO), EV-DO rev. A, 3GPP LTE, WiMAX, 4G including LTE Advanced and the like, and 5G including 5G NR or 5G LTE, or combinations thereof. Wired network protocols that may be utilized by the communication network 210 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication network 210 may also comprise additional base stations, controller nodes, telephony switches, internet routers, network gateways, computer systems, communication links, other types of communication equipment, and combinations thereof.

The communication links connecting the access node 230 to the 5G core 220 may respectively use various communication media, such as air, space, metal, optical fiber, other signal propagation paths, and combinations thereof. The communication links may respectively be wired or wireless and use various communication protocols such as Internet, Internet protocol (IP), LAN, optical networking, hybrid fiber coax (HFC), telephony, Ti, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1×RTT, GSM, UMTS, HSPA, EV-DO, EV-DO rev. A, 3GPP LTE, WiMAX, 4G including LTE Advanced and the like, and 5G including 5G NR or 5G LTE, or combinations thereof. The communication links may respectively be a direct link or might include various equipment, intermediate components, systems, and networks. The communication links may comprise many different signals sharing the same link.

The communication network 210, the access node 230, and/or the 5G core 220 may collectively implement several control plane network functions (NFs) and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), an AMF, an SMF, and an Authentication Server Function (AUSF). The user plane NFs include but are not limited to a Unified Data Repository (UDR) and a User Plane Function (UPF). Control plane NFs can provide one or more NFs based on a request-response or subscribe-notify model. In some implementations, the PCF implements the URSP manager. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 220. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the 5G core 220, thereby terminating RAN control plane and UE traffic originating on either the N1 or N2 reference interface. In the 5G core 220, the functionality of the 4G MME is decomposed into the AMF and the SMF. The AMF receives all connection and session related information from the UE using N1 and N2 interfaces, and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Other network elements may be present in the system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access node 230 and the communication network 210.

Figure 5:
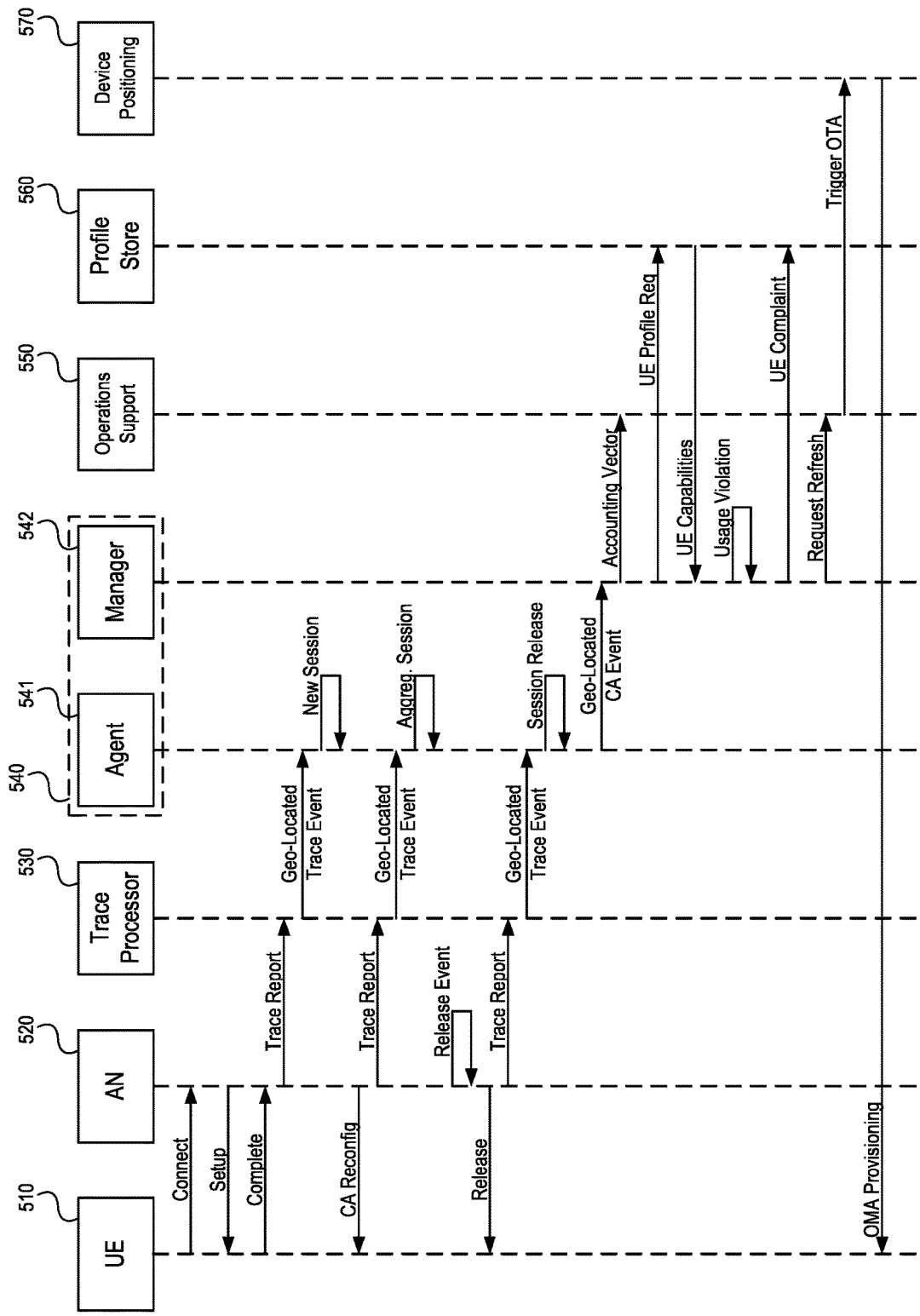
FIG. 5 illustrates an exemplary general communication flow for normalizing network device communication capabilities in accordance with various aspects of the present disclosure.

FIG. 5 illustrates exemplary communication flows to implement network device communication capability normalization in accordance with the present disclosure, in the case where the communication technique is CA. In FIG. 5, communications are illustrated among a UE 510 (which may correspond to one or more of the wireless devices 140 shown in FIG. 1, one or more of the wireless devices shown in FIG. 2, and/or the wireless device 400 shown in FIG. 4), an access node 520 (which may correspond to one or more of the access nodes 130 shown in FIG. 1, the access node 230 shown in FIG. 2, and/or the access node 300 shown in FIG. 3), a trace processor 530 (which may correspond to the controller 310 and/or the I/O module 311 shown in FIG. 3 or to a separate processing node), a normalizer entity 540 which includes an agent 541 and a manager 542 (which may collectively or individually correspond to the logic module 312 and/or the OTA module 313 shown in FIG. 3), an operations support entity 550, a profile store 560 (which may correspond to a 4G MME or a 5G AMF/SMF), and a device positioning entity 570. While these are shown as separate entities for purposes of illustration, in practice some of the entities may be combined, share components, or reside within one another. For example, in one particular implementation the trace processor 530, normalizer entity 540, and/or device positioning entity 570 may reside within the access node 520. In the case where the communication technique is NR CA, the normalizer entity 540 may be referred to as a MECANo entity, the agent 541 may be referred to as a MECANo agent, and the manager 542 may be referred to as a MECANo manager.

In the example of FIG. 5, the communication flow begins when the UE 510 requests a connection to the access node 520, which responds with setup information. When setup and connection are complete, the UE 510 transmits a completion notification to the access node 520. In the example shown in FIG. 5, the completion notification triggers the establishment of a trace session. Thus, the access node 520 sends a trace report (an example of a message report) corresponding to the connection setup event to the trace processor 530. The trace processor 530 determines the trace event and geolocation corresponding to the trace report and transmits the same to the agent 541. This causes the agent 541 to establish a new trace session.

Subsequently, the access node 520 transmits a carrier aggregation reconfiguration request to the UE 510 and then sends a trace report corresponding to the CA reconfiguration request to the trace processor 530. The trace processor 530 again determines the trace event and geolocation corresponding to the trace report and transmits the same to the agent 541. This causes the agent 541 to aggregate additional data to the established trace session. At a later point (which may occur after several additional message reports), the access node 520 receives a release event, causes the UE 510 to release, and transmits a trace report corresponding to the connection release event to the trace processor 530. The trace processor 530 again determines the trace event and geolocation corresponding to the trace report and transmits the same to the agent 541. This causes the agent 541 to release the trace session.

Upon release of the trace session, the agent 541 sends a geolocated CA event report to the manager 542. This report may correspond to the traced data aggregated by the agent 541 for the UE 510. The manager 542 determines an accounting vector and transmits the same to the operations support entity 550. The manager 542 may also query the profile store 560 for a capability profile corresponding to the UE 510. In such cases, the profile store 560 may response with the UE capabilities (e.g., a Capability Report). The manager 542 analyzes the data provided thereto (e.g., the geolocated CA event and, where applicable, the UE capabilities) to determine whether the UE 510 is technically capable of communicating with the access node 520 using CA and to determine whether the UE 510 is actually communicating with the access node 520 using CA. If the manager 542 determines that the UE 510 is capable of CA but is not actually using CA, the manager 542 may determine that a usage violation has occurred. The manager 542 may then send a UE complaint regarding the UE 510 to the profile store 560 and initiate an OTA upgrade process for the UE 510.

To do so, the manager 542 may request a refresh or redeployment of the MR corresponding to CA to the operations support entity 550. The operations support entity 550 may in turn transmit an OTA update trigger request to the device positioning entity 570. IN response to the OTA update trigger request, the device positioning entity 570 sends an Open Mobile Alliance (OMA) provisioning request, including updating configuration setting, to the UE 510. This enables CA in the UE 510.

Figure 6:
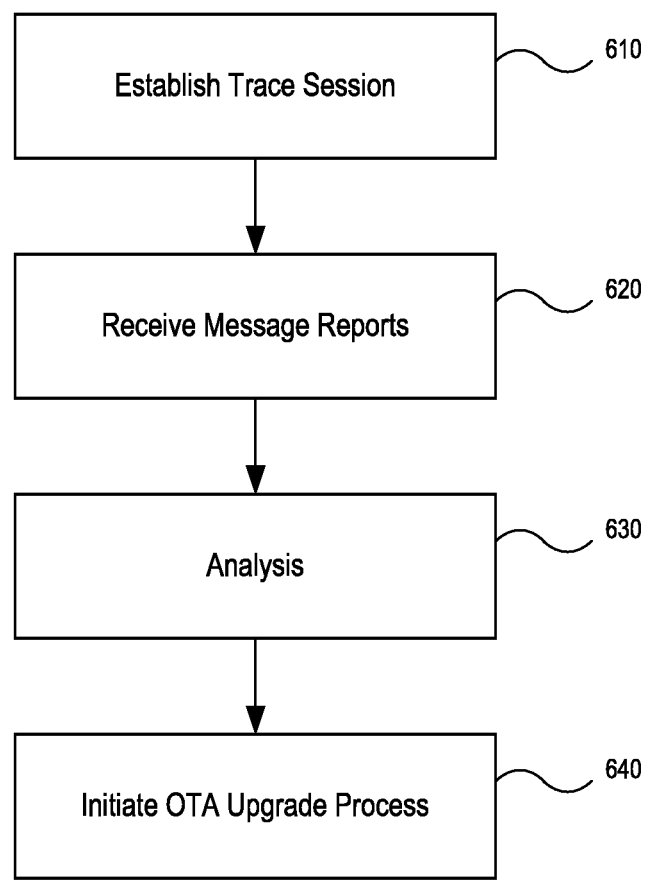
FIG. 6 illustrates an exemplary process flow for normalizing network device communication capabilities in accordance with various aspects of the present disclosure.

FIG. 6 illustrates an exemplary process flow for managing network communications (i.e., for normalizing network device communication capabilities). The operations of FIG. 6 will be described as being performed by the access node 300 for purposes of explanation, though they may be performed by any network entity acting as or including a trace processor. In performing the operations of FIG. 6, various entities may communicate among one another as illustrated in FIG. 5. FIG. 6 begins at operation 610 of establishing a trace session. The trace session may be established for a predetermined geographical area. Operation 610 may additionally include (or may be performed subsequent to) setting at threshold and/or monitoring a parameter, such establishing the trace session is performed in response to a determination that the parameter exceeds the threshold. The remaining operations of FIG. 6 may be performed while the trace session is active (i.e., after it has been established and before it has ended), and may be performed for all wireless devices located in the predetermined geographical area and connected to the access node 300.

At operation 620, the access node 300 or other network entity receives one or more message reports, respective ones of the message reports corresponding to protocol interactions between the access node 300 and a connected wireless device. The protocol interactions may be at least one of a connection setup event, a connection release event, or a carrier aggregation reconfiguration request event. Subsequently, at operation 630, analysis may be performed. The analysis may include determining whether the whether the wireless device is technically capable of communicating using a communication technique (e.g., CA), determining whether the wireless device is communicating with the access node 300 using the communication technique, determining whether a threshold percentage of capable additional wireless devices communicating with the access node are communicating using the communication technique, and/or determining whether the parameter no longer exceeds the threshold for establishing a trace session after it has initially exceeded the threshold. The analysis sub-operation of determining whether the wireless device is technically capable of communicating using the communication technique includes querying a network entity for a capability profile corresponding to the wireless device.

If it is determined, at operation 630, that the wireless device is capable of communicating using the communication technique and that the wireless device is not communicating with the access node using the communication technique, at operation 640 the access node 300 or other network entity may initiate the OTA upgrade process to enable the communication technique in the wireless device. In the event that the analysis indicates that the parameter no longer exceeds the threshold as described above, the access node 300 or other network entity may end the trace session and exit the process flow of FIG. 6.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing network communications, comprising:
    setting a threshold;
    monitoring a parameter to determine whether the parameter exceeds the threshold;
    establishing a trace session in response to determining that the parameter exceeds the threshold; and
    while the trace session is active:
        receiving a plurality of message reports, wherein respective ones of the plurality of message reports correspond to protocol interactions between an access node and a wireless device,
        determining whether the wireless device is technically capable of communicating using a communication technique,
        determining, from the plurality of message reports, whether the wireless device is communicating with the access node using the communication technique, and
        in response to a determination that the wireless device is capable of communicating using the communication technique and that the wireless device is not communicating with the access node using the communication technique, initiating an over-the-air upgrade process to enable the communication technique in the wireless device, and in response to determining that the parameter no longer exceeds the threshold, ending the trace session.

2. The method according to claim 1, wherein the communication technique is a carrier aggregation technique.

3. The method according to claim 1, further comprising:
while the trace session is active, wherein initiating the over-the-air upgrade process is performed in response to a further determination that a threshold percentage of capable additional wireless devices communicating with the access node are communicating using the communication technique.

4. The method according to claim 1, wherein determining whether the wireless device is technically capable of communicating using the communication technique includes querying a network entity for a capability profile corresponding to the wireless device.

5. The method according to claim 1, wherein respective ones of the plurality of message reports correspond to at least one of a connection setup event, a connection release event, or a carrier aggregation reconfiguration request event.

6. The method according to claim 1, wherein
the trace session is established for a predetermined geographical area, and
the operations of receiving the plurality of message reports, determining whether the wireless device is technically capable of communicating using the communication technique, determining whether the wireless device is communicating using the communication technique, and initiating the over-the-air upgrade process are performed for all wireless devices located in the predetermined geographical area and connected to the access node.

7. A processing node, comprising:
a memory; and
an electronic processor operatively connected to the memory, the electronic processor configured to perform operations comprising:
setting a threshold,
monitoring a parameter to determine whether the parameter exceeds the threshold,
establishing a trace session in response to determining that the parameter exceeds the threshold, and
while the trace session is active:
receiving a plurality of message reports, wherein respective ones of the plurality of message reports correspond to protocol interactions between an access node and a wireless device,
determining whether the wireless device is technically capable of communicating using a communication technique,
determining, from the plurality of message reports, whether the wireless device is communicating with the access node using the communication technique, and
in response to a determination that the wireless device is capable of communicating using the communication technique and that the wireless device is not communicating with the access node using the communication technique, initiating an over-the-air upgrade process to enable the communication technique in the wireless device, and
in response to determining that the parameter no longer exceeds the threshold, ending the trace session.

8. The processing node according to claim 7, wherein the communication technique is a carrier aggregation technique.

9. The processing node according to claim 7, further comprising:
while the trace session is active, wherein initiating the over-the-air upgrade process is performed in response to a further determination that a threshold percentage of capable additional wireless devices communicating with the access node are communicating using the communication technique.

10. The processing node according to claim 7, wherein determining whether the wireless device is technically capable of communicating using the communication technique includes querying a network entity for a capability profile corresponding to the wireless device.

11. The processing node according to claim 7, wherein
the trace session is established for a predetermined geographical area, and
the operations of receiving the plurality of message reports, determining whether the wireless device is technically capable of communicating using the communication technique, determining whether the wireless device is communicating using the communication technique, and initiating the over-the-air upgrade process are performed for all wireless devices located in the predetermined geographical area and connected to the access node.

12. The processing node according to claim 7, wherein the processing node is included in the access node.

13. The processing node according to claim 7, wherein the processing node is separate from the access node.

14. A system for managing network communications, comprising:
an access node;
a wireless device in communication with the access node; and
a processing node configured to perform operations comprising:
setting a threshold,
monitoring a parameter to determine whether the parameter exceeds the threshold,
establishing a trace session in response to determining that the parameter exceeds the threshold, and
while the trace session is active:
receiving a plurality of message reports, wherein respective ones of the plurality of message reports correspond to protocol interactions between the access node and the wireless device,
determining whether the wireless device is technically capable of communicating using a communication technique,
determining, from the plurality of message reports, whether the wireless device is communicating with the access node using the communication technique, and
in response to a determination that the wireless device is capable of communicating using the communication technique and that the wireless device is not communicating with the access node using the communication technique, initiating an over-the-air upgrade process to enable the communication technique in the wireless device, and
in response to determining that the parameter no longer exceeds the threshold, ending the trace session.

15. The system according to claim 14, wherein the communication technique is a carrier aggregation technique.

16. The system according to claim 14, further comprising:
while the trace session is active, wherein initiating the over-the-air upgrade process is performed in response to a further determination that a threshold percentage of capable additional wireless devices communicating with the access node are communicating using the communication technique.

17. The system according to claim 14, wherein determining whether the wireless device is technically capable of communicating using the communication technique includes querying a network entity for a capability profile corresponding to the wireless device.

18. The system according to claim 14, wherein respective ones of the plurality of message reports correspond to at least one of a connection setup event, a connection release event, or a carrier aggregation reconfiguration request event.

19. The system according to claim 14, wherein
the trace session is established for a predetermined geographical area, and
the operations of receiving the plurality of message reports, determining whether the wireless device is technically capable of communicating using the communication technique, determining whether the wireless device is communicating using the communication technique, and initiating the over-the-air upgrade process are performed for all wireless devices located in the predetermined geographical area and connected to the access node.

* * * * *